US008549121B2

(12) United States Patent
Nocera et al.

(10) Patent No.: US 8,549,121 B2
(45) Date of Patent: Oct. 1, 2013

(54) STATELESS-AGENTLESS SYSTEM AND METHOD OF MANAGING DATA IN A COMPUTING ENVIRONMENT

(75) Inventors: David Nocera, Martinsville, NJ (US); Chandrashekar Tippur, San Marcos, CA (US); Bhaskar Kasukhela, San Marcos, CA (US); Rajiv Konkimalla, Edison, NJ (US); Darren Richard Suprina, East Brunswick, NJ (US)

(73) Assignee: Spinella IP Holdings, Inc., Colts Neck, NJ (US)

( * ) Notice: Subject to any disclaimer, the term of this patent is extended or adjusted under 35 U.S.C. 154(b) by 1617 days.

(21) Appl. No.: 11/485,088

(22) Filed: Jul. 12, 2006

(65) Prior Publication Data

US 2012/0005322 A1 Jan. 5, 2012

Related U.S. Application Data

(63) Continuation-in-part of application No. 10/480,566, filed on Jul. 14, 2004, now abandoned.

(60) Provisional application No. 60/698,600, filed on Jul. 12, 2005.

(51) Int. Cl.
*G06F 15/16* (2006.01)

(52) U.S. Cl.
USPC .......... 709/223; 709/201; 709/202; 709/203; 709/208; 709/217; 709/218; 709/226; 709/229

(58) Field of Classification Search
USPC ................ 709/201, 202, 203, 208, 217, 218, 709/226, 229, 223
See application file for complete search history.

(56) References Cited

U.S. PATENT DOCUMENTS

| 6,029,175 | A * | 2/2000 | Chow et al. ........................ 1/1 |
| 6,510,465 | B1 | 1/2003 | Bilansky |
| 7,006,993 | B1 * | 2/2006 | Cheong et al. .................. 705/38 |
| 7,013,353 | B2 | 3/2006 | Parthasarathy |
| 7,032,031 | B2 * | 4/2006 | Jungck et al. ................. 709/246 |
| 7,051,070 | B2 * | 5/2006 | Tuttle et al. .................. 709/203 |
| 7,865,546 | B1 * | 1/2011 | Tuzhilin et al. ............... 709/202 |
| 2003/0126312 | A1 * | 7/2003 | Frolund et al. ............... 709/328 |

\* cited by examiner

*Primary Examiner* — Liangche A Wang
(74) *Attorney, Agent, or Firm* — Lowenstein Sandler LLP

(57) ABSTRACT

A data management system and method including a point of control configured to manage one or more target systems. The point of control divides a command sequence into a number of individual commands, and provides the individual commands to the stateless-agentless target system for execution. Furthermore, the point of control maintains the state of the command sequence and monitors the target system. As such, the target system is both "stateless" (i.e., the target system maintains no state information related to the command sequence) and "agentless" (i.e., the target system includes no software for the purpose of monitoring the target system.

15 Claims, 1 Drawing Sheet

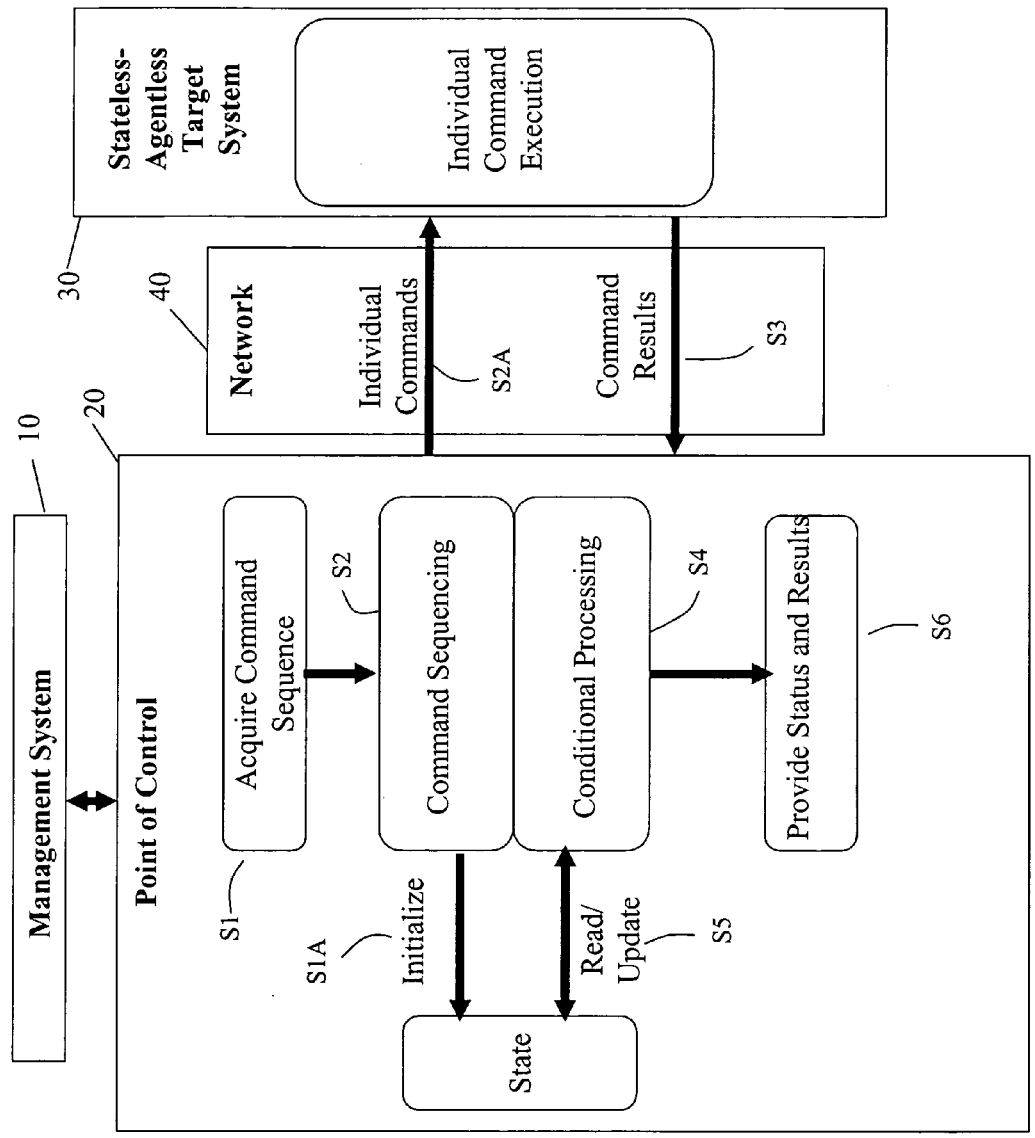

STATELESS-AGENTLESS SYSTEM AND METHOD OF MANAGING DATA IN A COMPUTING ENVIRONMENT

CROSS REFERENCE TO RELATED APPLICATIONS

This application is a continuation-in-part of U.S. patent application Ser. No. 10/480,566 filed on Jun. 11, 2002. This application also claims the benefit of U.S. Provisional Application No. 60/698,600 filed Jul. 12, 2005. U.S. patent application Ser. No. 10/480,566 and U.S. Provisional Application No. 60/698,600 are incorporated by reference herein.

FIELD OF THE INVENTION

The present invention relates to the command and control of computing systems, and more specifically to a method and system for managing the command and control of one or more target systems using a point of control system, without having to maintain on the target system any state information, script, software, or virtual machine code.

BACKGROUND OF THE INVENTION

In conventional computing environments, the only means available to invoke the execution of commands, in sequence, upon a target system require that at least one of the following be installed on the target system: 1) a platform-specific (i.e., native) binary executables on the target system, 2) scripts and matching scripting language interpreters (e.g., PERL, PYTHON, Windows BAT Files plus their respective interpreters), or 3) a virtual machine interpreter and/or a "just in time" (JIT) compiler and matching virtual machine executables (e.g., a Java virtual machine (VM)). All of these methods require that the target system support the installation of compilation and/or interpretive software, and further requires the storage of scripts and other executables prior to their use on the target system. These requirement necessitate that additional software be installed on the target system, at a cost expressed in terms of target system resources consumed (i.e., storage space), the time required, by person or by automation, to conduct and validate the installation of the software, and the cost of maintaining the software after installation (i.e., providing patches, software repair, software replacement, and/or software removal).

In addition, conventional systems require the means to provide support for the installation and configuration of software on each of the target systems maintained in the computing environment. Furthermore, access credentials sufficient to support the installation and configuration of the software must be provided and managed.

Another drawback of conventional systems wherein the software is maintained on the one or more target systems is that such software, once installed, must be granted privileges sufficient to carry out its intended tasks. As such, the software must be free of any intentional or accidental compromises which may impede or disrupt the intended use of the target system.

Moreover, conventional systems and methods place a significant burden on the system administrator to assemble and have available the technical skills necessary to craft scripts, binary executables, and/or virtual machine programs specific to each target system to be managed and/or monitored. This generally requires the administrator to hire staff or consultants to author the required code or acquire the required code or files from a third party.

Traditionally, there are four principal architectures by which one or more target systems receive requests for command execution from a central managing system. The first architecture involves processing the request using specific protocols (e.g., SNMP), in which a standard agent (i.e., the target system) exposes control functionality and target system data to the managing system. According to this architecture, the software enabling the support of a such a protocol must be installed and configured on the target system in support of this capability, or enabled if already installed, and secured against unauthorized access requests.

A second common architecture, referred to as a "service" model, involves the use of a target system thread of execution (such as, for example, a daemon process on Linux systems or a Service on Windows systems), which responds to requests made of it by the managing system.

A third general architecture, referred to as an "agent" model, involves the use of a communications protocol (such as Telnet, SSH, FTP, or one of proprietary design) by the managing system, to invoke the execution of scripts or executables previously loaded or installed on the target system, whose resultant data is optionally captured by the managing system. An agent, or agent system, is defined as a system having installed thereon software specifically adapted for the purpose of monitoring that system. Generally, the monitoring software on the agent system includes a schedule of actions to be taken and sequences of commands to be executed.

At a high level, these individual commands have no state or state information. However, individual commands may be logically associated and strung together in a command sequence. As such, the results of the individual commands that make up a command sequence may be considered together to inform and/or direct future processing by a system (e.g., data collection, parsing, storage, communications, etc.). In order to perform an action which is conditioned on the results of a plurality of individual commands requires the management of the state of the command sequence. The command results and state of the command sequence executions are stored on the agent system, pending delivery of the results to a managing system.

However, each of the above-described architectures disadvantageously require that software and/or command scripts be installed on the target system. Further, the software and/or scripts must be executed on the target system, and require the use of significant processing resources. Additionally, such software and/or scripts must be maintained, irrespective of whether or not the installation is permanent (i.e., in the event the target system has mass storage) or loaded upon reboot (i.e., in the event the target system is "diskless"). Moreover, IT organizations consider the enabling of generalized command and control protocols (such as SNMP) on a target system as a security risk.

A fourth architecture, referred to as an "agentless" model, involves the use of a communications protocol (such as, for example, Telnet, SSH, or FTP) by the managing system, to invoke the execution of a specific and singular command on the target system, whose resultant data is optionally captured by the managing system. According to this model, no software is installed on the target system for the purpose of monitoring that system. However, such software is forwarded to that system and executed upon demand. Because this software is not 'permanently' stored on the agentless target system, it is not able to survive a reboot. However, once a command sequence is provided to such agentless target system, all instructions of the command sequence are executed, with the state of such execution managed and maintained by the agentless target system. Furthermore, the results are passed back to the managing system, as there are no provisions for the storage of the results on the agentless target system.

However, the conventional agentless model is able to execute only individual commands on the target system, and not command sequences. As such, the traditional agentless model does not support conditional execution of commands on the target system.

Consequently, there is a need in the art for a system and method for efficiently and effectively managing one or more target systems using a managing system.

SUMMARY OF THE INVENTION

The above-described problems are addressed and a technical solution is achieved in the art by a system architecture providing a stateless and agentless system and method for managing data in a computing environment. According to an embodiment of the present invention, a system and method are provided for commanding and controlling one or more target systems with a managing system, without having to manage (i.e., maintain and update) on the target system either state information or monitoring scripts, software, or virtual machine codes.

According to an embodiment of the present invention, the system and method include a managing system, herein referred to as a point of control, which manages one or more target systems. The point of control manages a set of conditional commands and resultant state information, and sends or posts individual command requests to the target system. Advantageously, the target system may rely on its native capabilities (e.g., software, applications, code) to process the individual command request and provide the requested result.

According to an embodiment of the present invention, the point of control conveys the individual command requests to a target system and manages (i.e., maintains and updates) the state information associated with the command requests, and captures the resulting data generated by the target system. Furthermore, the individual results generated by the target system are captured by the point of control, as if command execution had occurred locally.

According to an embodiment of the present invention, the point of control conducts command sequence execution and information gathering activities normally conducted on the target system. Advantageously, the point of control is target-system agnostic (i.e., capable of supporting any type of target system), and ubiquitous (i.e., supported by any communications protocol, or combination of protocols, capable of conveying data and resident on the point of control and the target system).

The stateless-agentless system architecture provides for the management and control of the target system in a manner such that the need to install and maintain monitoring software on the target system is eliminated. As such, the system according to an embodiment of the present invention further eliminates the need for the assignment of access and execution credentials historically needed to support software installed on the target system. Furthermore, the software-free target systems are less susceptible to intentional or accidental compromises, resulting in a safer and more secure computing environment.

According to an embodiment of the present invention, the management of command sequencing (handled by the point of control) is bifurcated from the execution of individual commands (handled by the target system). These two functions are separated and performed across a communications link (i.e., over a network) established between the point of control and the target system. As a result of this division of work, the management of the state information may be handled by the point of control, thus creating an environment wherein neither software nor state need be maintained on the target system.

According to an embodiment of the present invention, the stateless-agentless target system does not execute, manage, or maintain state or state information. Advantageously, the state information associated with the execution of a sequence of commands is divorced from the execution of the individual commands of such a sequence. According to an embodiment of the present invention, only individual commands are executed by the target system, the remainder of the processing and management is performed by the point of control.

According to an embodiment of the present invention, the system architecture provides for the separation of the data collection steps from the maintenance of the state associated with doing so. That is, the target system may respond to individual requests for data (i.e., individual commands) without regard to the state of a command sequence (i.e., a plurality of individual commands), while the point of control tracks and updates the state of the command sequence, and provides the target system with instructions based at least in part on the state information.

BRIEF DESCRIPTION OF THE DRAWINGS

The present invention will be more readily understood from the detailed description of exemplary embodiments presented below considered in conjunction with the attached drawing, of which:

FIG. 1 illustrates a system and process flow for a stateless-agentless management architecture, according to an embodiment of the present invention.

It is to be understood that the attached drawings are for purposes of illustrating the concepts of the invention and may not be to scale.

DETAILED DESCRIPTION OF THE INVENTION

The present invention relates to a stateless-agentless system and method of processing and managing data in a compute environment.

According to an embodiment of the present invention, the system comprises a Management System 10 communicatively connected to a Point of Control 20. The Point of Control 20 is communicatively connected over a Network 40 to one or more Stateless-Agentless Target Systems 30, as shown in FIG. 1. The term "communicatively connected" is intended to include any type of connection, whether wired or wireless, in which data may be communicated. The term "communicatively connected" is intended to include a connection between devices and/or programs within a single computer or between devices and/or programs on separate computers. One having ordinary skill in the art will appreciate that the system may include any number of Points of Control 20 and any number of Stateless-Agentless Target Systems 30. An exemplary embodiment of the present invention having one Point of Control 20 and one Stateless-Agentless Target System 30 is described in detail below with regard to FIG. 1

The term "stateless-agentless" as used herein is defined as a system which is both "agentless" (i.e., a system on which no software has been installed for the purpose of monitoring the system) and "stateless (i.e., a system which does not execute state, only individual commands). The 'state' associated with the execution of a sequence of commands is divorced from the execution of the individual commands of the sequence. Only individual commands are executed by the Stateless-Agentless Target System 30. The remainder of the work (i.e., the determination and maintenance of state information related to a sequence of commands) is performed by the Point of Control 20.

The Point of Control 20 is a computer-based system comprised of one or more computers and/or one or more computer-executable programs configured to manage the one or more communicatively connected Stateless-Agentless Target Systems 30. The term "computer" is intended to include any data processing device, such as a desktop computer, a laptop computer, a mainframe computer, a personal digital assistant, a server, a handheld device, or any other device able to process data.

According to an embodiment of the present invention, the Point of Control 20 is configured to manage the process of accumulating and managing information or data associated with one or more Stateless-Agentless Target Systems 30. The Point of Control 20 acquires a command sequence to be processed, either directly or indirectly, from a Management System 10. The command sequence is comprised of a number of individual, but related commands. A command is defined as including, but not limited to, a specific, individual, and atomic (i.e., stand alone) request which may be made of the system being monitored (i.e., the Stateless-Agentless Target System 30).

The commands are executed by the Stateless-Agentless Target System 30 using one or more execution facilities native to the Stateless-Agentless Target System 30. The execution facilities of the Stateless-Agentless Target System 30 include, but are not limited to, are those resources (e.g., programs or applications) that are native to that system, or assumed to be present as a result of the installation and/or use of other software programs or applications. As such, no additional execution facilities need be loaded or installed on the Stateless-Agentless Target System 30 in order to conduct the monitoring of that system, thus making it an 'agentless' system. For example, the command "ls/" on a UNIX system or "dir c:" on a Windows system produces a listing of the requested local storage resource. Because these execution facilities are native to UNIX-based and Windows-based systems, respectively, it is not necessary to install this capability on the Stateless-Agentless Target System 30. Additionally, such a command is atomic (e.g., stand-alone) in nature, meaning it may be executed by itself and is not dependent upon external events or resources to support its usage.

The command sequence may include, but is not limited to, a list of commands maintained and processed by the Point of Control 20. According to an embodiment of the present invention, the command sequence may be processed according to a schedule, wherein individual commands are communicated to the Stateless-Agentless Target System 30 for execution pursuant to that schedule. As such, the distinction between an individual command, which is executed on a Stateless-Agentless Target System 30, and a command sequence, which are held by and executed on a Point of Control 20 is a matter of storage and state management. The Point of Control 20 may sequentially step through and post the individual commands to the Target System 30 for execution, thereby managing the process of what the Stateless-Agentless Target System 30 executes. Furthermore, the Point of Control 20 maintains and updates the state associated with the execution of any command sequence by making conditional decisions regarding the next individual command to be executed.

According to an embodiment of the present invention, the Point of Control 20 may also receive from the Management System 10 the protocol to use when communicating with each Stateless-Agentless Target System 30 (i.e., the protocol of the communication link) and the authentication/authorization credentials required to engage each Stateless-Agentless Target System 30 in such communication.

In addition, the Point of Control 20 gathers, maintains, and stores all command results generated by executing the individual commands, and provides these results, either individually or in aggregate to the Management System 10.

One having ordinary skill in the art will appreciate that the Network 40 may be based on any suitable protocol, such as, for example, TELNET, HTTP, FTP, etc. Any protocol available to both the Point of Control 20 and the Stateless-Agentless Target System 30 is a candidate to relay commands and requests therebetween, as well as the transport of responses generated, if any, by the Stateless-Agentless Target System 30, back to the Point of Control 20. Optionally, the Network 40 may be secured using any suitable security technique, such as, for example, TELNET, HTTP, FTP, etc.

According to an embodiment of the present invention, any suitable security service may be used to secure the Network 40, including but not limited to encryption services supported by the participating systems.

One having ordinary skill in the art will appreciate that the Point of Control 20 and the one or more Stateless-Agentless Target Systems 30 may comprise one or more computer programs executing on programmable computers that include, but are not limited to, a storage medium readable by a processor (including volatile and non-volatile memory and/or storage elements), at least one input device and one or more output devices. The one or more computer-executable programs may be implemented in a high-level procedural or object-oriented programming language able to communicate with a computer, or implemented in assembly or machine language, if desired. One having ordinary skill in the art will appreciate that the programming language may be compiled or interpreted.

FIG. 1 illustrates an exemplary embodiment of the process flow of the system architecture according to an embodiment of the present invention. In step S1, a command sequence is acquired by the Point of Control 20, either directly or indirectly, from the Management System 10. The command sequence is defined as a series of related commands acquired by the Point of Control 20 which are to be provided to the one or more Stateless-Agentless Target Systems 30 for execution. According to an embodiment of the present invention, the command sequence may be comprised of a plurality of individual commands which are related to a single, specific Stateless-Agentless Target System 30 or multiple Stateless-Agentless Target Systems 30. The command sequence may be obtained by the Point of Control 20 in any suitable manner, including, but not limited to, by the reading of a script file, as the output of an executable, and/or as a result of a virtual machine engine execution (such as, for example, a Java Virtual Machine). One having ordinary skill in the art will appreciate that the origins of the script, executable, or virtual machine files, and any utilities used to generate arbitrary resulting files is known in the art.

Optionally, in step S1A, upon receipt of the command sequence, the Point of Control 20 may initialize the state of the command sequence.

Next, In step S2, the Point of Control 20 performs command sequencing on the plurality of command results received from the one or more Stateless-Agentless Target Systems 30. The command sequencing includes, but is not limited to, ordering the individual commands, processing the commands, and, in step S2A, sending the individual commands to the Stateless-Agentless Target System 30 for execution to acquire specific data points (e.g., the command results), while handling the conditional logic, data storage, and communications with the Management System 10.

For example, the following command sequence (which includes three individual commands) combines to request that a directory listing be performed on three volumes of a Windows-bases system:

dir c:
dir d:
dire:

A communications link using a desired protocol is established via the Network 40, and the appropriate authentication/ authorization credentials are provided to establish access and permissions to execute the commands on the Stateless-Agentless Target System 30. The "dir c:" command is atomic (e.g., stand-alone), and so it is passed to the Stateless-Agentless Target System 30 for execution. The command results generated by the Stateless-Agentless Target System 30 are passed back to the Point of Control 20, via the communications link, and processed (e.g., collected, parsed, etc.) by the Point of Control 20. Each of the three individual commands are managed in a similar manner, until the command sequence is exhausted. Upon completion of the command sequence, the communications link is closed and the command results are stored locally on the Point of Control 20 or forwarded to the Management System 10 (see step S6 below).

According to an embodiment of the present invention, the Point of Control 20 determines the appropriate means by which to transmit or send each individual command to the Stateless-Agentless Target System 30, and then posts that command to the receiving Stateless-Agentless Target System 30 using that means of communication.

In the event the Stateless-Agentless Target System 30 is unavailable to receive the one or more individual commands, the Point of Control 20 manages this condition and responds accordingly. For example, if a Stateless-Agentless Target System 30 is unable to support the type, format, or protocol of a specific command, the Point of Control 20 modifies the command to allow for processing by the Stateless-Agentless Target System 30.

According to an embodiment of the present invention, the Point of Control 20 may interpret, substitute, interject, delete, ignore, and/or modify the command sequence or individual commands so as to permit receipt and handling by the one or more Stateless-Agentless Target Systems 30. For example, the Point of Control 20 may receive a command sequence which includes an individual Windows "dir" command. If the Point of Control 20 detects that the intended Stateless-Agentless Target System 30 is a UNIX-based system, then the Point of Control 20 may substitute a UNIX "ls" command for the Windows "dir" command.

Following issuance of the individual commands of the command sequence to the one or more Stateless-Agentless Target Systems 30, the Point of Control 20 maintains the state of the command sequence on behalf of the Stateless-Agentless Target Systems 30, as described in step S5 below.

In step S3, the one or more Stateless-Agentless Target Systems 30 execute the individual commands and return the one or more command results to the Point of Control 20. The command results may include, but are not limited to, any data or information generated by the Stateless-Agentless Target Systems 30 upon execution of the individual commands. One having ordinary skill in the art will appreciate that steps S2, S2A, and S3 may be performed concurrently, wherein the Point of Control 20 sends one or more individual commands to the Stateless-Agentless Target System 30 while receiving command results from a Stateless-Agentless Target System 30.

Optionally, the Point of Control 20 may be configured to expect, wait for, and/or ignore command results generated and provided by the Stateless-Agentless Target System 30. In the event a Stateless-Agentless Target System 30 fails to respond within a given time period, generally indicated either the command sequence or defined by the Point of Control 20, the Point of Control 20 manages this timeout condition and reacts accordingly. For example, the Point of Control 20 may interpret, substitute, interject, ignore, and/or modify any command results received, not received, timed out, and report and track success or error conditions, or lack thereof.

According to an embodiment of the present invention, in step S4, the Point of Control 20 performs conditional processing on the command sequence. Generally, conditional processing is conducted by the Point of Control 20 when a future action is based, at least in part, on previously acquired data or command results.

For example, in order to return a 'yes' or a 'no' answer as to whether all parts of an application are running, it may be necessary to test the status of each application part individually. Consider the following exemplary command sequence:

```
if exist c:\Program Files\myapp\cmd.exe goto :OK1
echo NG - missing cmd.exe
goto :NG1
:OK1
if exist c:\Program Files\myapp\config.txt goto :OK2
echo NG - missing config.txt
goto :NG2
:OK2
echo OK
:NG
exit
```

Note that two files (cmd.exe and config.txt) are to be tested to determine if they are running properly. If either is missing, text generated for the Management System 10 indicates the detection of an error, and provides the name of the missing file. If both files are found, the Point of Control 20 provides the Management System 10 with an "OK" message.

The first statement (if exist c:\Program Files\myapp\cmd.exe goto :OK1) is a command sequence comprised of two individual commands: Command 1) a test to determine if a specific file exists, and Command 2) an action to take if it does (note: no specified action is taken if it does not). As such, the Point of Control 20 reads this instruction, opens a communications link having a desired protocol with the Stateless-Agentless Target System 30, establishes its right to execute commands on the Stateless-Agentless Target System 30 using the authentication/authorization credentials previously provided, and submits the first individual command for execution. The Stateless-Agentless Target System 30 returns the command result indicating whether the file either exists or it doesn't. The Point of Control 20 evaluates the first command result and, based at least in part on the result, determines its next step. In this example, assuming it was determined that the file exists, the Point of Control 20 moves to label ":OK1" and prepares for the next command. Accordingly, while specific (individual) commands are sent to and performed by the Stateless-Agentless Target System 30, the determination as to which command to execute next (if any) is made by the Point of Control 20.

In step S5, the Point of Control 20 reads and updates the state in view of the one or more command results received from the Stateless-Agentless Target System 30. According to an embodiment of the present invention, the individual command results are associated with the original command sequence acquired by the Point of Control 20. As such, the individual command results may be associated with one another by the Point of Control 20 in order to update and maintain the state of the command sequence.

According to an embodiment of the present invention, the Point of Control 20 may change, alter, control, and/or adjust the order in which the individual commands are posted to the Stateless-Agentless Target System 30 in view of the state information, related command results received from the one or more Stateless-Agentless Target Systems 30 (or lack thereof), response timeouts, and/or any other interaction the Point of Control 20 has with either the Stateless-Agentless Target System 30 or applications, utilities, services, or systems (e.g., the Management System 10) communicatively connected to the Point of Control 20.

In step S6, the Point of Control 20, upon the completion or termination of its processing of the command sequence, may optionally declare a final result. Furthermore, the Point of Control 20 may optionally provide the final result to one or more other systems.

It is to be understood that the exemplary embodiments are merely illustrative of the invention and that many variations of the above-described embodiments may be devised by one skilled in the art without departing from the scope of the invention. It is therefore intended that all such variations be included within the scope of the following claims and their equivalents.

What is claimed is:

1. A system comprising:
a stateless-agentless target system configured to execute individual command requests and generate individual command results, wherein the stateless-agentless target system comprises no software for monitoring the stateless-agentless target system; and
a point of control comprising a data processing device communicatively connected to the stateless-agentless target system via a network, wherein the point of control is configured to:
divide a command sequence into a plurality of individual commands, wherein the command sequence comprises a series of related commands acquired by the point of control which are to be provided to the stateless-agentless target system for execution,
provide the individual commands to the stateless-agentless target system,
receive a plurality of individual command results, and
manage a state associated with the command sequence based at least in part on the plurality of command results, wherein the state indicates the individual command to be executed next.

2. The system of claim 1, further comprising a management system configured to provide the command sequence to the point of control.

3. The system of claim 2, wherein the management system is configured to receive at least one command result from the point of control.

4. The system of claim 1, wherein the stateless-agentless target system executes the at least one individual command using only native execution facilities.

5. The system of claim 1, wherein the point of control is configured to perform conditional processing on the command sequence.

6. The system of claim 5, wherein the conditional processing is based at least in part on the state associated with the command sequence.

7. The system of claim 1, wherein the point of control updates the state of the command sequence.

8. The system of claim 7, wherein the state is updated based at least in part on the individual command results.

9. A method comprising:
dividing, by a data processing device, a command sequence into a plurality of individual commands, wherein the command sequence comprises a series of related commands acquired by a point of control which are to be provided to a stateless-agentless target system for execution;
providing the plurality of individual commands to the stateless-agentless target system for execution, wherein the stateless-agentless target system comprises no software for monitoring the stateless-agentless target system;
receiving a plurality of command results from the stateless-agentless target system; and
managing a state of the command sequence based at least in part on the plurality of command results, wherein the state indicates the individual command to be executed next.

10. The method of claim 9, further comprising performing command sequencing.

11. The method of claim 9, further comprising performing conditional processing based at least in part on the state of the command sequence.

12. The method of claim 9, wherein managing the state comprises updating the state.

13. The method of claim 12, wherein the state is updated based at least in part on the individual command results.

14. The method of claim 9, wherein each of the plurality of individual commands are executed using only execution facilities native to the stateless-agentless target system.

15. A system comprising:
a stateless-agentless target system communicatively connected via a network to a point of control comprising a data processing device, wherein the stateless-agentless target system comprises no software for monitoring the stateless-agentless target system, wherein the stateless-agentless target system executes individual command requests of a command sequence using only native execution facilities and generates individual command results, wherein the command sequence comprises a series of related commands acquired by the point of control which are to be provided to the stateless-agentless target system for execution, wherein the point of control manages a state associated with the command sequence based at least in part on the individual command results, and wherein the state indicates the individual command to be executed next.

* * * * *